(12) United States Patent
Muggenthaler et al.

(10) Patent No.: US 11,949,536 B2
(45) Date of Patent: Apr. 2, 2024

(54) TRANSFERRING DIGITAL SUBSCRIBER CONNECTION SIGNALS VIA A COAXIAL CABLE

(71) Applicant: DEUTSCHE TELEKOM AG, Bonn (DE)

(72) Inventors: Peter Muggenthaler, Modautal (DE); Marko Loeffelholz, Griesheim (DE); Christoph Tudziers, Zwingenberg (DE); Ralph Leppla, Bickenbach (DE)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 18/249,260

(22) PCT Filed: Oct. 7, 2021

(86) PCT No.: PCT/EP2021/077739
§ 371 (c)(1),
(2) Date: Apr. 17, 2023

(87) PCT Pub. No.: WO2022/089909
PCT Pub. Date: May 5, 2022

(65) Prior Publication Data
US 2023/0327906 A1 Oct. 12, 2023

(30) Foreign Application Priority Data
Oct. 29, 2020 (EP) ..................... 20204625

(51) Int. Cl.
*H04L 12/28* (2006.01)
*H04B 3/21* (2006.01)

(52) U.S. Cl.
CPC ........... *H04L 12/2898* (2013.01); *H04B 3/21* (2013.01)

(58) Field of Classification Search
CPC ......... H04L 12/2898; H04B 3/21; H04B 3/02; H04N 7/106
See application file for complete search history.

(56) References Cited

U.S. PATENT DOCUMENTS

| | | | | |
|---|---|---|---|---|
| 2001/0047414 A1* | 11/2001 | Yoon | ................... | H04L 12/4641 709/225 |
| 2003/0151695 A1* | 8/2003 | Sahlin | ................. | H04L 12/2898 348/705 |
| 2007/0274730 A1* | 11/2007 | Koo | ................... | H04N 21/4402 398/163 |

FOREIGN PATENT DOCUMENTS

| | | |
|---|---|---|
| EP | 2945360 A1 | 11/2015 |
| WO | WO 0143324 A1 | 6/2001 |

* cited by examiner

*Primary Examiner* — Kenneth T Lam
(74) *Attorney, Agent, or Firm* — LEYDIG, VOIT & MAYER, LTD.

(57) ABSTRACT

A method for transmitting digital subscriber connection signals to an interface of an end user via a coaxial cable includes: supplying, by a distribution point unit (DPU), first balanced subscriber connection signals to the coaxial cable by a first transformation; coupling unbalanced subscriber connection signals into the coaxial cable into a lower frequency range of an overall frequency range; attenuating, by means of a filtering device, a reflection of the unbalanced subscriber connection signals in the coaxial cable; a second transformation of the unbalanced subscriber connection signals into second balanced subscriber connection signals by means of a balun device assigned to the interface, wherein the input impedance of the filtering device is adjusted with respect to reflections from the direction of the customer terminal output; and separately making the second balanced subscriber connection signals available at the customer terminal output.

13 Claims, 4 Drawing Sheets

TRANSFERRING DIGITAL SUBSCRIBER CONNECTION SIGNALS VIA A COAXIAL CABLE

CROSS-REFERENCE TO PRIOR APPLICATIONS

This application is a U.S. National Phase application under 35 U.S.C. § 371 of International Application No. PCT/EP2021/077739, filed on Oct. 7, 2021, and claims benefit to European Patent Application No. EP 20204625.6, filed on Oct. 29, 2020. The International Application was published in German on May 5, 2022 as WO 2022/089909 A1 under PCT Article 21(2).

FIELD

The present invention relates to a method for transmitting digital subscriber connection signals to an interface of an end user via a coaxial cable, wherein the coaxial cable has an overall frequency range configured for transmitting TV signals to the interface of the end user in an upper frequency range of the overall frequency range and for transmitting subscriber connection signals to a customer terminal output in a lower frequency range such as to allow for interference-free concurrent operation of TV and subscriber connection signals for the end user when the signals are received via the same end user interface.

The invention further relates to a corresponding system for transmitting digital subscriber connection signals to an interface of an end user via a coaxial cable, wherein the system comprises at least one distribution point unit (DPU), at least the coaxial cable, and at least the interface having the customer terminal output. The invention furthermore relates to an interface of an end user, in particular as part of a system according to the invention and for use in a method according to the invention.

BACKGROUND

Some methods for producing a digital subscriber line access multiplexer (DSLAM) for simultaneously providing different media such as TV, radio, and the internet at a single point of use for the end user are already discussed in the prior art. For integrating TV or satellite (SAT) signals with IP signals in particular, the prior art describes a 'CoaxLAN' technology, in which an existing antenna cable for receiving SAT signals is used for supplying IP signals without impairing television reception. One drawback, among others, of this CoaxLAN technology is that the antenna outlet/LAN has to be continuously supplied with power, even in standby mode.

A further drawback of conventional CoaxLAN technology is that, in CoaxLAN technology, a 'shared transmission medium' is used, in which a plurality of end users have access to and share the transmission medium because the total bit rates available for a building have to be shared with various end users in the building by way of a power inserter connected downstream of the antenna. Owing to the shared medium topology, another drawback is that defective network stations may impair the functionality of all the other network stations. In addition, all the stations are able to also access data packets that are not addressed to them, drastically reducing the data security of the supplied data.

SUMMARY

In an exemplary embodiment, the present invention provides a method for transmitting digital subscriber connection signals to an interface of an end user via a coaxial cable, wherein the coaxial cable has an overall frequency range configured for transmitting TV signals to the interface of the end user in an upper frequency range of the overall frequency range, and wherein the interface comprises a customer terminal output. The method includes the following steps: supplying, by a distribution point unit (DPU), first balanced subscriber connection signals to the coaxial cable by a first transformation, directed toward the customer terminal output, of the first balanced subscriber connection signals into unbalanced subscriber connection signals by means of a distribution point balanced-to-unbalanced transformer device (balun device); coupling the unbalanced subscriber connection signals into the coaxial cable into a lower frequency range of the overall frequency range, wherein the lower frequency range is below the upper frequency range without any overlap; attenuating, by means of a filtering device, a reflection of the unbalanced subscriber connection signals in the at least one coaxial cable; a second transformation, directed toward the customer terminal output, of the unbalanced subscriber connection signals into second balanced subscriber connection signals by means of a balun device assigned to the interface, wherein the input impedance of the filtering device is adjusted with respect to reflections from the direction of the customer terminal output; and separately making the second balanced subscriber connection signals available at the customer terminal output

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
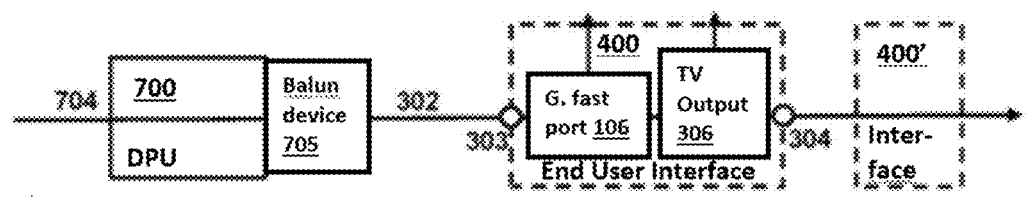
FIG. 1 shows a schematic structure of a device or structure for carrying out a method according to the invention.

Exemplary embodiments of the invention provide a method for transmitting digital subscriber connection signals to an interface of an end user via a coaxial cable, wherein the coaxial cable has an overall frequency range configured for transmitting TV signals to the interface of the end user in an upper frequency range of the overall frequency range and for supplying subscriber connection signals in a lower frequency range, wherein the method makes it possible, in a simple and efficient manner, to transmit the subscriber connection signals in addition to the TV signals in a relatively broadband way. In particular, exemplary embodiments of the present invention in this respect use an existing coaxial cable which is already used for transmitting in particular TV signals and which leads to the interface of an end user. In addition, exemplary embodiments of the invention provide a corresponding system for transmitting digital subscriber connection signals to an interface of an end user via a coaxial cable, and to provide an interface of an end user.

In an exemplary embodiment, the invention provides a method for transmitting digital subscriber connection signals to an interface of an end user via a coaxial cable, wherein the coaxial cable has an overall frequency range configured for transmitting TV signals to the interface of the end user in an upper frequency range of the overall frequency range, wherein the interface comprises a customer terminal output, wherein the method comprises the following steps:

supplying, by a distribution point unit (DPU), first balanced subscriber connection signals to the coaxial cable by a first transformation, directed toward the customer terminal output, of the first balanced subscriber connection signals into unbalanced subscriber connection signals via a distribution point balanced-to-unbalanced transformer device (balun device), coupling the unbalanced subscriber connection signals into the coaxial cable into a lower frequency range of the overall frequency range, wherein the lower frequency range is below the upper frequency range without any overlap, attenuating, via a filtering device, a reflection of the unbalanced subscriber connection signals in the at least one coaxial cable and a second transformation, directed toward the customer terminal output, of the unbalanced subscriber connection signals into second balanced subscriber connection signals via a balanced-to-unbalanced transformer device (balun device) assigned to the interface, wherein the input impedance of the filtering device is adjusted with respect to reflections from the direction of the customer terminal output, separately making the second balanced subscriber connection signals available at the customer terminal output.

Compared with the prior art, an advantage of a method according to the invention is that every end user, e.g., of a building, can use the maximum provided bandwidth in an undivided manner, regardless of the user behavior of other end users of the building, i.e., this bandwidth does not have to be shared with the other end users of the same coaxial cable system.

Since the upper frequency range for the TV signals and the lower frequency range for the subscriber connection signals do not overlap, the end user can concurrently operate TV and internet without any interference.

According to the invention, a distribution point unit (DPU) supplies first balanced subscriber connection signals to the coaxial cable, wherein a first transformation, directed toward the customer terminal output, of the first balanced subscriber connection signals into unbalanced subscriber connection signals is carried out via a distribution point balanced-to-unbalanced transformer device (balun device). These unbalanced subscriber connection signals are coupled into the coaxial cable into a lower frequency range of the overall frequency range, wherein the lower frequency range is below the upper frequency range without any overlap (i.e., the upper and lower operating frequency ranges are separate). According to the invention, a reflection of the unbalanced subscriber connection signals in the at least one coaxial cable is attenuated via a filtering device, and furthermore a second transformation, directed toward the customer terminal output, of the unbalanced subscriber connection signals into second balanced subscriber connection signals is carried out via a balanced-to-unbalanced transformer device (balun device) assigned to the interface. In the process, the input impedance of the filtering device is adjusted with respect to reflections from the direction of the customer terminal output.

In this context, 'balanced' means that two AC voltages in phase opposition and of equal magnitude in relation to ground potential are present, with 'unbalanced' meaning that only one AC voltage in relation to ground potential or a pseudo-ground potential is present.

According to the invention, it is provided that, in buildings equipped with coaxial star wiring for supplying each individual housing unit with TV signals in particular, broadband digital subscriber connection signals (in particular to allow for broadband internet connectivity) can additionally be transmitted in a simple manner. Within the context of the present invention, 'broadband' means in particular digital subscriber connection signals that are transmitted on a frequency range (or overall operating frequency range) of at least approximately 100 MHz, although preferably of at least approximately 200 MHz, particularly preferably of at least approximately 400 MHz. For this purpose, it is provided according to the invention that the existing coaxial wiring is used together with an end user interface, wherein the end user interface, or the interface of an end user, has a customer terminal output via which the internet connectivity can be implemented. The transmission medium of the coaxial cable is typically able to transmit subscriber connection signals and TV signals up to frequencies in the range of 1 GHz and above. Out of this overall frequency range, the TV signals are transmitted to the interface of the end user in the upper frequency range and are available at said interface for the end user to use as TV signals. The subscriber connection signals are transmitted to the customer terminal output as unbalanced subscriber connection signals in the coaxial cable in the lower frequency range of the overall frequency range. According to the invention, the lower frequency range is below the upper frequency range without any overlap. According to the invention, the interface of an end user is provided or implemented in particular as a so-called 'multimedia outlet' (MMO). By way of example, the multimedia outlet can be produced having an enclosure as an insert in a cover frame and has an output for TV signals and the customer terminal output. The customer terminal output will also be referred to below as a G.fast output or G.fast port. According to the invention, the G.fast port in particular has a shielded Cat6A RJ45 connector to connect commercially available shielded Cat5E or Cat6A patch cables for connecting a modem or a modem device or a router device (referred to hereinafter as a G.fast modem). In addition, the end user interface or multimedia outlet comprises an input (IN port) for connecting the coaxial cable, and an output (OUT port) for allowing a further TV outlet to be connected via the input thereof. Typically, it is technically possible to connect an end user interface or multimedia outlet and one or more TV outlets (i.e., interfaces for tapping TV signals) to a single coaxial cable (that ends, for example, in one housing unit of a building) one after the other, i.e., in series; if this is the case, then in an arrangement of this kind the end user interface or multimedia outlet can be arranged at different positions, for instance at position 1 when the end user interface or multimedia outlet is connected, via its IN port, to the coaxial cable, or at position 2 when a multimedia outlet is connected, via its IN port, to the output of a TV outlet located at position 1. To keep the signal attenuation as low as possible at the customer terminal output or at the G.fast port, the multimedia outlet should preferably be placed at position 1 of an existing TV outlet installation or of a TV outlet installation to be newly set up. Owing to the low decoupling attenuation of just 10.5 dB at the TV port, however, the multimedia outlet can also be installed universally at different positions in relation to the TV transmission (or TV signals). Since the first and the second SAT/TV outlet have throughput attenuation (Port IN↔Port OUT) of around 3 dB, the subscriber connection signals or G.fast signals at position 3 then, however, lose in total around 6 dB, or slightly more than 6 dB, compared with the preferred position 1; this corresponds to a significant bit rate loss. Normal SAT/TV outlets for position 1 often have decoupling attenuation of approximately 18 dB at the TV port. A standard grading of the decoupling attenuations of the SAT/TV outlets at the TV port may, for example, be 18, 14, 10, etc. dB. The aim is that, when a plurality of SAT/TV outlets are cascaded in series, all the TV ports have around the same output level in consideration of their throughput attenuations and the connection cable attenuations. To prevent reflections, the last outlet in each case has to be terminated with 75Ω. In a so-called 'TV terminal outlet,' this is permanently built in.

According to the invention, it is provided to transmit the subscriber connection signals (i.e., in the lower frequency range) in accordance with different modes or in different frequency ranges via or via the coaxial cable(s). According to a variant, for this purpose the frequency range from approximately 2 MHz to around 212 MHz is used for transmitting the subscriber connection signals; this is also referred to hereinafter as G.fast 212. According to a further variant, for this purpose the frequency range from approximately 2 MHz to around 424 MHz is used for transmitting the subscriber connection signals; this is also referred to hereinafter as G.fast 424. Both variants can be operated in a so-called 'simplex' operating mode or in a so-called 'duplex' operating mode. In simplex mode, which is generally used, the G.fast technology operates using a common-frequency and time-division multiplexing method (i.e., with a sequence of a transmission time period, a break, and a receipt time period). Owing to the time-division multiplexing method, reflections of subscriber connection signals (or G.fast signals) at the ports and junctions in the signal path play a minor role as long as these reflections do not exceed a certain signal strength and the duration of any multiple reflections (so-called 'post-cursor' signals) between the reflection points does not exceed the (transmission—receipt) break, and thus these reflections do not extend into the receipt time period of the transmitting side itself. It is then unlikely (i.e., the possibility can largely be ruled out) that the signal-to-noise ratio (SNR) of the relevant receiver will be reduced as a result of simultaneous reflections of the particular transmitter. In duplex mode, the G.fast technology operates under the common-frequency and common-time method. For this purpose, efficient echo compensation and, in conjunction therewith, significantly higher reflection attenuation of all the transmission chain ports and junctions in the signal path are advantageous. Otherwise, the signal-to-noise ratio (SNR), and thus the bit rate of the relevant receiver, may be considerably reduced as a result of simultaneous reflections of the particular transmitter. According to the invention, it is provided that the end user interface or, in particular, the customer terminal output is able to implement or provide all these operating modes or variants. In particular, it is provided according to the invention that the customer terminal output of the end user interface (G.fast port of the MMO) meets the requirements for implementing, or is able to implement, the G.fast Duplex 424 technology or this operating mode (in particular with respect to reflection attenuation).

In the various operating modes or variants, the above-described bit rate loss when the end user interface or interface of an end user (and thus the customer terminal output) is located not at position 1 but at position 2 or 3 (i.e., with additional throughput attenuation of around 3 dB between Port IN and Port OUT (of an outlet at position 1) or collectively of around 6 dB (of the outlets at positions 1 and 2)) is around 200 Mbit/s (for 3 dB) or around 400 Mbit/s (for 6 dB) for G.fast 212 (i.e., for transmission in the lower frequency range between approximately 2 MHz and 212 MHz) and is approximately 400 Mbit/s (for 3 dB) or approximately 800 Mbit/s (for 6 dB) for G.fast 424 (i.e., for transmission in the lower frequency range between approximately 2 MHz and 212 MHz); in the case of G.fast 424 Duplex (i.e., transmission in the lower frequency range between approximately 2 MHz and 424 MHz in duplex mode), the losses would be considerably higher.

Advantageous embodiments and developments of the invention are set out in the description with reference to the drawings.

According to a preferred embodiment of the present invention, it is provided that the balanced-to-unbalanced transformer device assigned to the interface comprises a choke device and a transformer device, wherein in particular the choke device is passed through first and the transformer device is passed through next in the direction of the customer terminal output, wherein the input impedance of the filtering device is adjusted (in particular with respect to reflections from the direction of the customer terminal output) by a compensation capacitor between the filtering device and the balanced-to-unbalanced transformer device assigned to the interface, wherein the compensation capacitor is in particular arranged between the filtering device and the choke device.

As a result, it is advantageously possible according to the invention to achieve particularly high reflection attenuation at the customer terminal output, which, in particular up to a frequency of approximately 370 MHz, may be at least approximately 22 dB at the customer terminal output (or G.fast port) and/or at the IN port, in particular so as to be prepared for later use by G.fast Simplex 424 and G.fast Duplex 212 or G.fast Duplex 424.

According to a further embodiment of the present invention, it is provided that the input impedance of the filtering device is adjusted using impedance transformation in that twin lines having a characteristic impedance that is different from the characteristic impedance of the coaxial cable are used to implement the choke device, wherein the impedance transformation is implemented on the basis of a short length of the twin lines, wherein in particular twin lines having a characteristic impedance in the range between 45Ω and 65Ω, preferably between 50Ω and 60Ω, in particular 55Ω, are used.

As a result, it is advantageously possible according to the invention for the input impedance of the filtering device to be adjusted in a simple manner using impedance transformation.

According to a further embodiment of the present invention, it is provided that the impedance compensation is carried out via the choke device and the transformer device, in particular in addition to the compensation capacitor ($C_K$), wherein the choke device comprises an annular core and an inductance per winding of between 1.0 µH and 1.2 µH, in particular around 1.1 µH, and wherein the annular core is in particular wrapped in wire in the form of a twin line, wherein the wire is in particular a multi-insulated wire and in particular has a characteristic impedance of between 65Ω and 85Ω, preferably of between 70Ω and 80Ω, in particular of around 75Ω.

According to a further embodiment of the present invention, it is provided that the transformer device is configured to transform impedances in a range between 65Ω and 85Ω, preferably between 70Ω and 80Ω, in particular of around 75Ω, into an impedance of between 95Ω and 105Ω, in particular 100Ω.

According to a further embodiment of the present invention, it is provided that the choke device is a common-mode choke, wherein the choke device has in particular 10 windings and a common-mode inductance of 110 µH, and/or wherein the transformer device comprises magnetizing inductances of 263 µH on the 75-Ω side and of 353 µH on the 100-Ω side.

According to a further embodiment of the present invention, it is provided that, for a plurality of coaxial cables, the first transformation, directed toward the customer terminal output, comprises converting a plurality of balanced digital subscriber connection signals into a plurality of unbalanced digital DSL signals, wherein the distribution point balanced-to-unbalanced transformer device located at the distribution point unit is a multiple balanced-to-unbalanced transformer unit, wherein in particular the plurality of balanced digital subscriber connection signals have an impedance in a first impedance range and the plurality of unbalanced digital subscriber connection signals have an impedance in a second impedance range, and/or that the second transformation, directed toward the customer terminal output, causes the unbalanced digital subscriber connection signals having an impedance in the second impedance range to be converted into second balanced subscriber connection signals having an impedance in the first impedance range, in particular in a frequency range between 1 MHz and 222 MHz, preferably between 2 MHz and 212 MHz, or in a frequency range between 1 MHz and 444 MHz, preferably between 2 MHz and 424 MHz, wherein the first impedance range is in the range between 95Ω and 105Ω, in particular 100Ω, and the second impedance range is in the range between 70Ω and 80Ω, in particular 75Ω.

According to a further embodiment of the present invention, it is provided that the unbalanced subscriber connection signals are coupled into the coaxial cable at an impedance in the second impedance range using 75-Ω TV bidirectional couplers, wherein the coaxial cable is in particular part of a coaxial TV star topology, in particular of a building.

According to a further embodiment of the present invention, it is provided that the lower frequency range includes subscriber connection signals up to around 212 MHz and/or the upper frequency range includes the TV signals above around 262 MHz and/or that the lower frequency range includes subscriber connection signals up to around 424 MHz and/or the upper frequency range includes TV signals above around 524 MHz.

According to a further embodiment of the present invention, it is provided that, at the customer terminal output of the interface, input reflection attenuation of more than or exactly 22 dB, in particular of more than or exactly 26 dB, in particular of more than or exactly 30 dB, is carried out up to at least 350 MHz, preferably up to at least 370 MHz.

According to a further embodiment of the present invention, it is provided that the balanced-to-unbalanced transformer device assigned to the interface implements transverse conversion loss of at least 25 dB between 2 MHz and 1 GHz, and/or that the balanced-to-unbalanced transformer device assigned to the interface implements attenuation of S21, the forward transmission coefficient, of less than 4 dB between 2 MHz and 1 GHz, and in particular attenuation of less than 1.1 dB between 2 MHz and 424 MHz.

As a result, according to such an embodiment of the invention it is advantageously possible to obtain particularly good protection against reflections.

In a further exemplary embodiment, the invention provides a system for transmitting digital subscriber connection signals to an interface of an end user via a coaxial cable, wherein the coaxial cable has an overall frequency range configured for transmitting TV signals to the interface of the end user in an upper frequency range of the overall frequency range, wherein the interface comprises a customer terminal output, wherein the system comprises at least one distribution point unit (DPU), at least the coaxial cable, and at least the interface having the customer terminal output, and wherein the system is configured such as to cause:

a distribution point unit (DPU) to supply first balanced subscriber connection signals to the coaxial cable by a first transformation, directed toward the customer terminal output, of the first balanced subscriber connection signals into unbalanced subscriber connection signals via a distribution point balanced-to-unbalanced transformer device (balun device), the unbalanced subscriber connection signals to be coupled into the coaxial cable into a lower frequency range of the overall frequency range, wherein the lower frequency range is below the upper frequency range without any overlap, a reflection of the unbalanced subscriber connection signals in the at least one coaxial cable to be attenuated via a filtering device and a second transformation, directed toward the customer terminal output, of the unbalanced subscriber connection signals into second balanced subscriber connection signals to be carried out using a balanced-to-unbalanced transformer device (balun device) assigned to the interface, wherein the input impedance of the filtering device is adjusted with respect to reflections from the direction of the customer terminal output, and the second balanced subscriber connection signals to be separately made available at the customer terminal output.

According to the present invention, therefore, it is advantageously possible to provide a system according to the invention corresponding to a method according to the invention in such a way that transmission of digital subscriber connection signals via a coaxial cable can be improved.

In a further exemplary embodiment, the invention provides an interface of an end user, in particular as part of a system according to the invention and for use in a method according to the invention, for transmitting digital subscriber connection signals to the interface via a coaxial cable, wherein the coaxial cable has an overall frequency range configured for transmitting TV signals to the interface of the end user in an upper frequency range of the overall frequency range, wherein the interface comprises a customer terminal output, wherein, with respect to unbalanced subscriber connection signals which are in a lower frequency range of the overall frequency range, said lower frequency range being below the upper frequency range without any overlap, and which are coupled into the coaxial cable, the interface is configured such as to cause:

a reflection of the unbalanced subscriber connection signals in the at least one coaxial cable to be attenuated via a filtering device and a second transformation, directed toward the customer terminal output, of the unbalanced subscriber connection signals into second balanced subscriber connection signals to be carried out using a balanced-to-unbalanced transformer device (balun device) assigned to the interface, wherein the input impedance of the filtering device is adjusted with respect to reflections from the direction of the customer terminal output, and the second balanced subscriber connection signals to be separately made available at the customer terminal output, wherein, in addition to a TV output, the interface comprises the customer terminal output and is configured to make TV signals available at the TV output in the upper frequency range and to make balanced subscriber connection signals available at the customer terminal output in the lower frequency range.

According to the present invention, therefore, it is advantageously possible to provide an interface of an end user according to the invention corresponding to a method according to the invention and thus to improve transmission of digital subscriber connection signals via a coaxial cable.

Further details, features, and advantages of the invention become clear from the drawings and from the following description of preferred embodiments given on the basis of the drawings. In this case, the drawings merely illustrate example embodiments of the invention and do not limit the main concept of the invention.

FIG. 1 shows a schematic structure of a device or structure for carrying out a method according to the invention. First, a distribution point unit (DPU) 700 supplies first balanced subscriber connection signals to at least one coaxial cable 302 via fiber-optic cables 704. In a first transformation, the first balanced digital subscriber connection signals are converted into unbalanced subscriber connection signals via at least one distribution point balanced-to-unbalanced transformer device (balun device) 705.

The unbalanced subscriber connection signals are coupled into the coaxial cable into a lower frequency range of the overall frequency range, wherein the lower frequency range is below the upper frequency range without any overlap. At the location of the interface 400 of an end user (or end user interface 400), the subscriber connection signals transported via the coaxial cable are transformed into second balanced subscriber connection signals and are made available at the customer terminal output 106 (or G.fast port 106). The TV signal transported in the upper frequency range via the coaxial cable is made available at a TV output 306 of the end user interface 400. In addition, FIG. 1 shows the input (IN port) 303 of the end user interface 400 and the output (OUT port) 304 of the end user interface 400 (for connecting further end user interfaces 400 or TV outlets).

The end user interface 400 is shown at position 1 in FIG. 1, i.e., it is the first end user interface or multimedia outlet 400 (connected via its IN port to the relevant coaxial cable 302). FIG. 1 also schematically shows an interface 400' or outlet arranged at position 2 and connected by its IN port to the OUT port 304 of the end user interface 400; in this case, however, this is not an end user interface 400 according to the invention but merely a conventionally used outlet for providing TV signals. According to the invention, however, this option makes it possible, in a simple manner, to embed the end user interface 400 according to the invention in an existing home TV installation. In an installation of this kind, comprising for example a maximum of three outlets altogether (arranged in series on a coaxial cable 302), there are resulting attenuation values of −10.5 dBr at the TV port (or TV output), of −1.5 dBr at the G.fast port (i.e., at the customer terminal output 106), and of −3.5 dBr at the OUT port. The attenuations of high-performance (coaxial) connection cables between the outlets are not taken into consideration here since they are both variable and relatively low (approximately 0.9 dB/10 m/200 MHz; 1.8 dB/10 m/800 MHz). Radio operation is not possible using the multimedia outlet 400 or the other outlets (400') since G.fast is operated up to 212/424 MHz. If the multimedia outlet 400 is at position 2, the following attenuation values would be obtained: −13.5 dBr at the TV port (or TV output), −4.5 dBr at the G.fast port (i.e., at the customer terminal output 106), and −6.5 dBr at the OUT port. If the multimedia outlet 400 is at position 3, the following attenuation values would be obtained: −16.5 dBr at the TV port (or TV output), −7.5 dBr at the G.fast port (i.e., at the customer terminal output 106), and −9.5 dBr at the OUT port.

According to the invention, the end user interface 400 is intended in particular for use in conjunction with G.fast technology. In general, the implementation of the G.fast technology involves using a central unit or distribution point unit (DPU) 700. A G.fast distribution point unit (DPU) 700 of this kind in particular comprises a plurality of ports or outputs (G.fast ports), for example 4, 8 or 16 G.fast ports. In accordance with the illustration according to FIG. 1, a G.fast distribution point unit 700 of this kind (or its ports or outputs) is typically connected to a corresponding number of corresponding modem devices or router devices, in each case by way of a coaxial cable 302, i.e., to 4, 8, or 16 G.fast modems in the example, which are typically arranged in the individual homes (using the relevant end user interface 400). The DPU or G.fast distribution point unit 700 is installed at a central point of a, for example, multi-home building and is provided with broadband internet connectivity from outside (typically via optical fibers). In residential buildings having more than 16 housing units, a plurality of distribution point units 700 or G.fast distribution point units can also be installed. According to the invention, the existing star topology of the TV cable network (coaxial cables) is used as the transmission medium.

Figure 2:
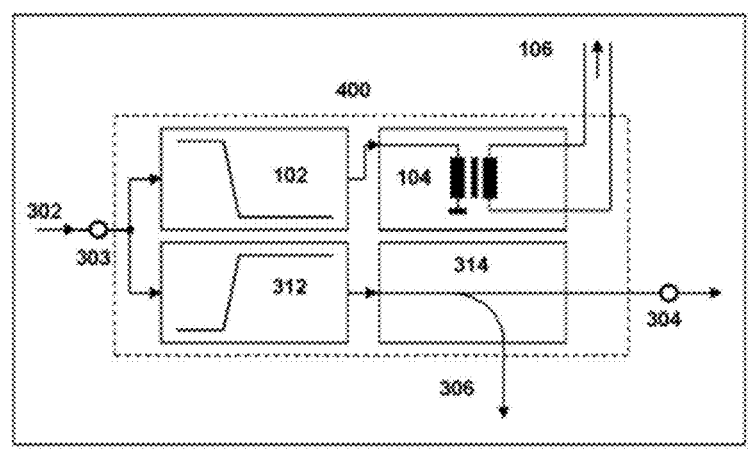
FIG. 2 is a block diagram of an interface of an end user (or end user interface) comprising a customer terminal output.

FIG. 2 shows a block diagram of an interface of an end user 400 (or end user interface 400) comprising the customer terminal output 106, the TV output 306, the input (IN port) 303, and the output (OUT port) 304. Apart from the part or branch (comprising the low-pass filter 102 as the filtering device 102 and the balanced-to-unbalanced transformer device 104) leading to the customer terminal output 106, the end user interface 400 additionally has a high-pass filter 312 and a directional coupler 314 in another part or in another branch. The TV signals are filtered out via the high-pass filter 312 and are provided in order to be conducted onward to the TV output 306 and/or the output (OUT port 304) of the end user interface 400. Via the directional coupler 314, these TV signals are supplied to (or made available at) both the TV output 306 (in particular adjusted to a characteristic impedance of 75Ω and in particular with a decoupling attenuation of 10.5 dB or of around 10.5 dB) and the output (OUT port 304) (in particular likewise adjusted to a characteristic impedance of 75Ω and in particular with decoupling attenuation of 3.5 dB or of around 3.5 dB). This last-described further branch of the end user interface 400 will not be described in more detail hereinafter since it is the normal approach in relation to TV signals. FIG. 2 also schematically shows the coaxial cable 302 at the input of the end user interface 400.

Unlike conventional end user interfaces or multimedia outlets comprising radio, TV, and SAT connectors (or outputs), according to the invention the end user interface 400 (or multimedia outlet 400) has, as mentioned above, just one TV output 306 and thus utilizes only one directional coupler 314, which is designed in a transformer-like manner, for example. Its properties correspond to a conventional monodirectional tap having around 8.8 dB output coupling. The high-pass filter 312 may, for example, be designed having four circuits. In this case, according to the invention it is provided in particular that this high-pass filter is included in the reflection attenuation of the low-pass filter 102 (wired in parallel when viewed from the IN port 303), and vice versa.

In the following, the operating frequency ranges of the individual MMO ports of a multimedia outlet 400 are stated by way of example:
- IN port: 2 MHz-864 MHz
- G.fast Port for G.fast 212 (G.fast 424): 2 MHz-212 MHz (2 MHz-424 MHz)
- TV Port for G.fast 212 (G.fast 424): 262 MHz-864 MHz (524-864 MHz)
- OUT Port for G.fast 212 (G.fast 424): 262 MHz-864 MHz (524-864 MHz)

The low-pass filter 102 (or filtering device 102), high-pass filter 312, and directional coupler 314 units are, by definition, unbalanced or coaxial. The normal transmission mode is common mode H common mode (also shortened to CM hereinafter), i.e., normally CMH↔CM. The balanced-to-unbalanced transformer device 104 (balun device 104) converts the common mode into the differential mode (also shortened to DM hereinafter) and vice versa, i.e., normally CMH↔DM or DMH↔CM. Since a balanced-to-unbalanced transformer device (balun device) has finite CM suppression in relation to the signal of the balanced (DM) side, in this case a parasitic and undesirable CMH↔CM transmission additionally takes place. This undesirable CMH↔CM transmission by contrast with the desired CMH↔DM transmission is referred to as transverse conversion loss (TCL), through the balanced-to-unbalanced transformer device 104 (balun device 104).

Figure 9:
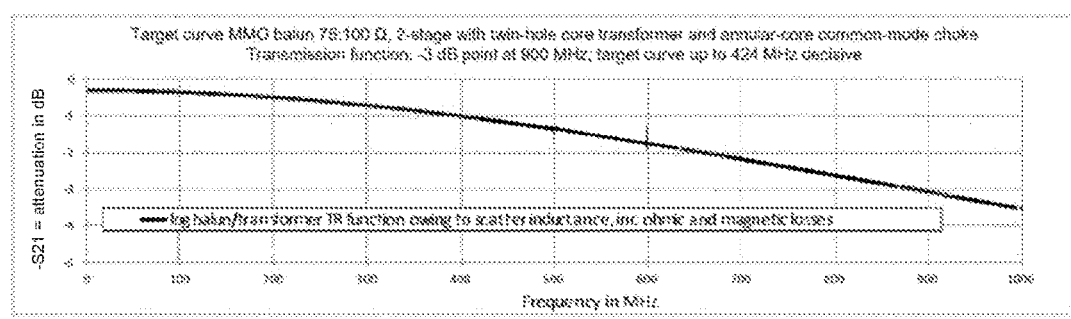
FIG. 9 shows a target curve for the attenuation of the balanced-to-unbalanced transformer device (balun attenuation).

According to the invention, to operate the G.fast technology, the following target functions are obtained for the balanced-to-unbalanced transformer device 104 (balun device 104), the high-pass filter 312, and the low-pass filter 102, these target functions being indicated hereinafter for common mode (CM) and for differential mode (DM), where f is stated in Hz:

The CMH↔DM target function of the balun attenuation (attenuation of the balanced-to-unbalanced transformer device 104) per se is as follows:

$$a(f)_{Balun,CM \leftrightarrow DM} = -20 * \log\left[\frac{0.93}{1 + \left(\frac{f}{960 * 10^6}\right)^2}\right]$$

and is reproduced in FIG. 9 via a graph, this target curve being indicated by an S parameter: A negative S parameter corresponds to a positive attenuation. For simplicity, however, attenuations are referred to hereinafter.

Figure 10:
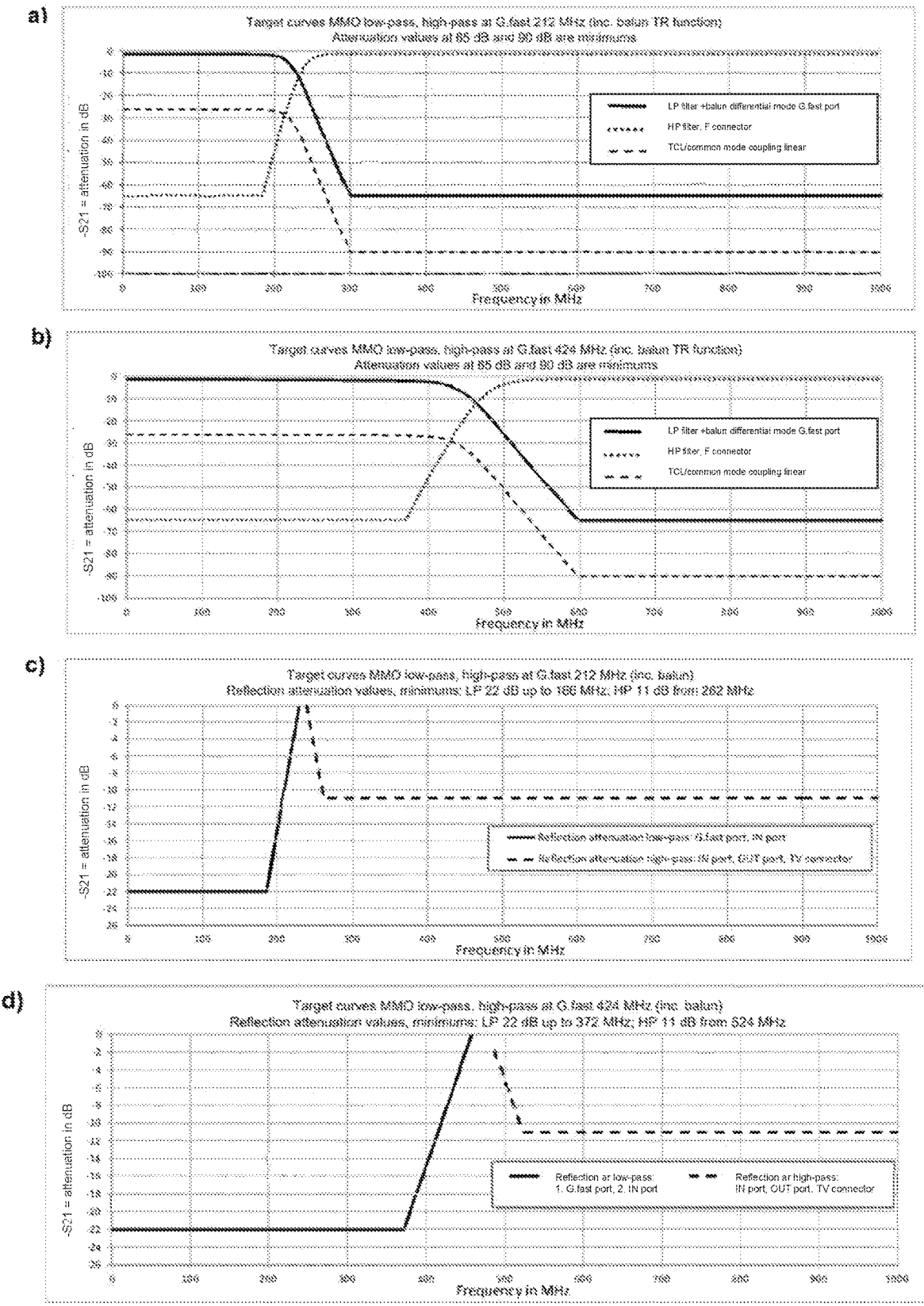
FIG. 10 shows target curves for the attenuation of the balanced-to-unbalanced transformer device (balun attenuation).

The following target functions are reproduced in FIGS. 10 a) to 10 d) via graphs:

The CMH↔DM target function of the low-pass filter attenuation for G.fast 212:

$$a(f)_{TP,CM \leftrightarrow DM} = \left\{-20 * \log\left[\frac{1}{1 + \left(\frac{f}{225 * 10^6}\right)^{25}}\right] + 1 \text{ dB}\right\}$$

The CMH↔DM target function of the low-pass filter attenuation including balun for G.fast 212:

$$a(f)_{TP,CM \leftrightarrow DM + Balun212} =$$
$$\left\{-20 * \log\left[\frac{0.93}{\left[1 + \left(\frac{f}{225 * 10^6}\right)^{25}\right] * \left[1 + \left(\frac{f}{960 * 10^6}\right)^2\right]}\right] + 1 \text{ dB}\right\} \leq 65 \text{ dB}$$

The CM target function of the high-pass filter attenuation for G.fast 212:

$$a(f)_{HP,CM212}\left\{ = -20 * \log\left[\frac{1}{1 + \left(\frac{240 * 10^6}{f}\right)^{28}}\right] + 1.5 \text{ dB}\right\} \leq 65 \text{ dB}$$

The CMH↔DM target function of the low-pass filter attenuation including balun for G.fast 424, simplex/duplex:

$$a(f)_{TP,CM \leftrightarrow DM + Balun424} =$$
$$\left\{-20 * \log\left[\frac{0.93}{\left[1 + \left(\frac{f}{450 * 10^6}\right)^{25}\right] * \left[1 + \left(\frac{f}{960 * 10^6}\right)^2\right]}\right] + 1 \text{ dB}\right\} \leq 65 \text{ dB}$$

The DM target function of the high-pass filter attenuation for G.fast 424, simplex/duplex:

$$a(f)_{HP,CM\leftrightarrow DM424} = \left\{ -20*\log\left[\cfrac{1}{1+\left(\cfrac{480*10^6}{f}\right)^{28}}\right] + 1.5 \text{ dB} \right\} \leq 65 \text{ dB}$$

The CMH↔DM target function of the low-pass filter attenuation including balun for G.fast 212, G.fast 424, simplex/duplex:

$$a(f)_{TP,CM\leftrightarrow CM+Balun212} = a(f)_{TP,CM\leftrightarrow DM+Balun212} + 25 \text{ dB} \leq 90 \text{ dB}$$

$$a(f)_{TP,CM\leftrightarrow CM+Balun424} = a(f)_{TP,CM\leftrightarrow DM+Balun424} + 25 \text{ dB} \leq 90 \text{ dB}$$

The TCL offset of the balun corresponds to its CMH↔CM attenuation and is at least 25 dB. For simplicity, however, only G.fast 424 will be referred to hereinafter (instead of G.fast simplex/duplex).

The target curves in the graphs in FIG. 10, too, are indicated as S parameters. A negative S parameter corresponds to a positive attenuation. For simplicity, however, attenuations will again be referred to.

The balun is implicitly included in the target functions for the low-pass filter.

According to the invention, it is advantageously possible for the balanced-to-unbalanced transformer device 104 (balun device 104) to have the same configuration for both G.fast 212 and G.fast 424.

Above approximately 500 MHz, a wavy curve shape of approximately +/−0.5 dB (in relation to the target function of TP attenuation) is expected owing to reflections resulting from unavoidable scatter inductances, but is tolerable. However, deviations beyond that typically lead to uncontrolled transmission behavior, e.g., resonance behavior or too low a TCL. According to the invention, the TCL offset of ≥25 dB between 2 MHz and 1000 MHz is to be applied in particular by the balun.

The target functions for the high-pass filter and for the low-pass filter purely mathematically describe the respective curves of the graphs up the minimum required reverse attenuation of 65 dB in order to obtain the curves of the graphs shown in FIG. 10 (and likewise to avoid the relatively complicated notation of the case distinctions); for this reason, the relationship ≤65 dB or even ≤90 dB exists in the low-pass filter.

When physically configuring the high-pass filter and the low-pass filter, ≥65 dB applies to the reverse attenuation.

Owing to the balanced G.fast port, the CMH↔CM target function is relevant only for the low-pass filter path; here, the target function of the CM attenuation in the entire bandwidth from 2 MHz-1000 MHz represents a minimum attenuation, with ≥90 dB applying to the reverse attenuation in the low-pass filter.

The high-pass filter and low-pass filter are operated up to the respective filter flanks.

The 22-dB reflection attenuation for the low-pass range applies to the low-pass filter in conjunction with the balun as a complete system.

According to the invention, in particular the low-pass filter is fully utilized by the G.fast useful signal right up to the filter flank.

The LC filters that are used in particular are based on total reflection in the stop band and are high-resistance in this case. This reflection begins to increase even before the signal attenuation at the flank noticeably increases.

To avoid having even more low-pass filter circuits, and thus higher production costs, the drop in the reflection attenuation of up to 9 dB from 186 MHz, in the case of G.fast 212, or from 372 MHz, in the case of G.fast 424, is tolerated at the boundary frequencies 212 MHz and 424 MHz, respectively.

Since the L and C components used in filters also have parasitic active-resistance components, these can shift the aforementioned 9-dB reflection attenuation up to around 10-11 dB when the filter is designed accordingly.

In the G.fast simplex mode, 9-dB reflection attenuation is not much of a problem because in this case, due to the time-division multiplexing mode, the SNR of the G.fast receiver cannot be affected, or can only barely be affected, as a result of a reflection.

In the duplex mode, there is then only a relatively narrow range that can impair the SNR of the G.fast receiver.

The G.fast port of the MMO is connected to the G.fast modem via a shielded Cat5E or Cat6A patch cable. Experiments have shown that 22-dB reflection attenuation is sufficient for utilizing the available reflection attenuation of 5 m-long Cat5E and Cat6A patch cables. A further increase of the reflection attenuation beyond 22 dB would not additionally improve the overall reflection attenuation at the input of the patch cable on the modem side toward the MMO.

Figure 3:
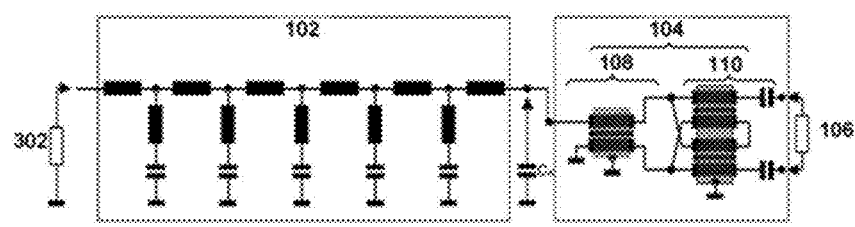
FIG. 3 is a circuit diagram of a part of the end user interface that leads to the customer terminal output, comprising a low-pass filter, a balanced-to-unbalanced transformer device (balun device), and the customer terminal output, according to a first embodiment of the invention.

FIG. 3 is a circuit diagram of the part of the end user interface 400 according to a first embodiment of the invention, namely the part or branch that leads to the customer terminal output 106. Downstream of the coaxial cable 302 (i.e., at the input 303, IN port, of the end user interface 400), the filtering device 102 in the form of a low-pass filter 102 can be seen. According to the first embodiment of the invention, a compensation capacitor $C_K$ adjoins the filtering device 102. In addition, a balanced-to-unbalanced transformer device 104 (balun device 104) assigned to the end user interface 400 adjoins the filtering device 102 or compensation capacitor $C_K$, said balanced-to-unbalanced transformer device 104 (or balun device 104) comprising a choke device 108 and a transformer device 110. The choke device 108 is formed in particular as a common-mode choke having a 75-Ω surge impedance. The transformer device 110 preferably brings about an adjustment to the impedance from 75Ω to 100Ω, such that there is a surge impedance of 100Ω at the customer terminal output 106 (G.fast port or G.fast output 106).

Figure 4:
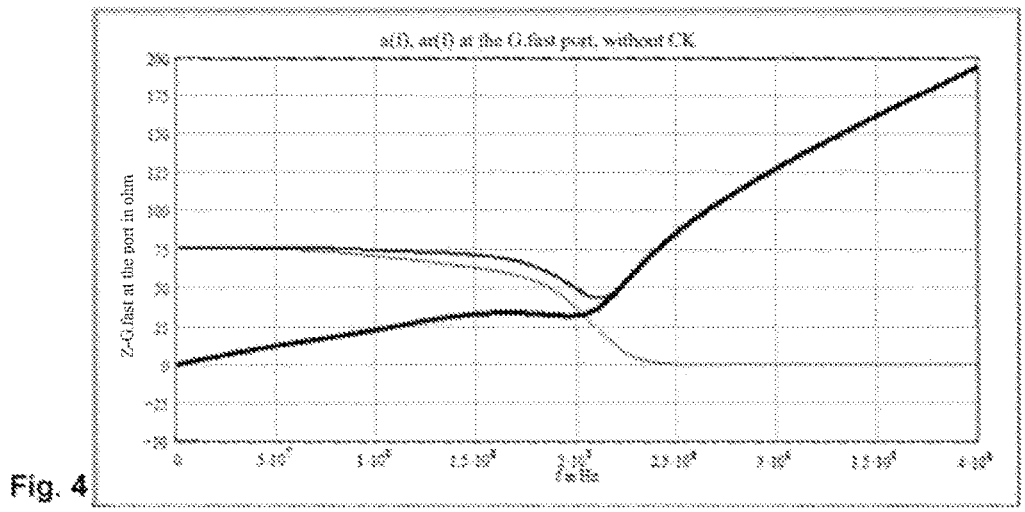
FIG. 4 shows various depictions in relation to the input impedance of the filtering device (low-pass filter) from the direction of the balun device assigned to the interface.
Figure 6:
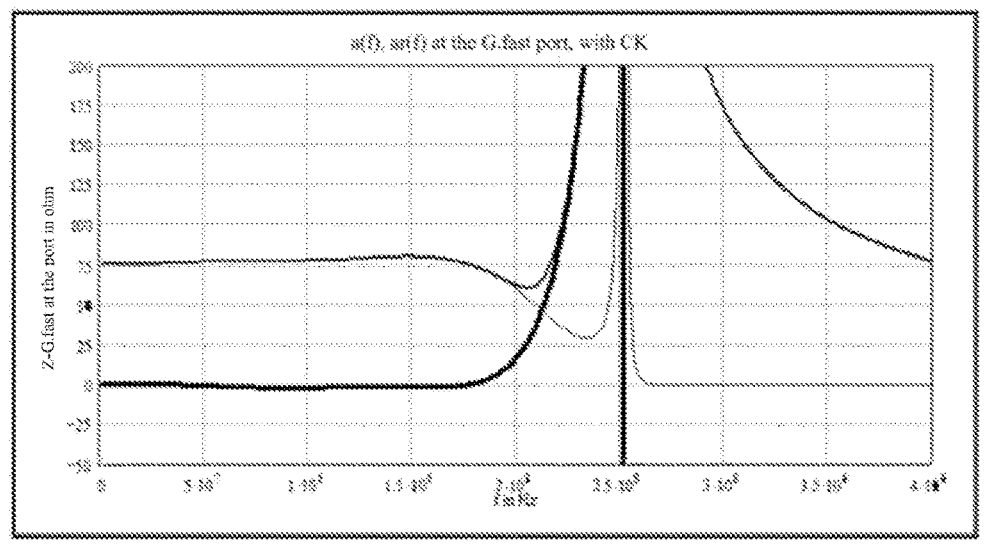
FIG. 6 shows various depictions in relation to the compensated input impedance of the filtering device (low-pass filter) from the direction of the balun device assigned to the interface, according to the first embodiment of the invention.

As shown schematically in FIG. 3, the low-pass filter 102 is provided or designed in particular in the form of an LC filtering device having six circuits. In the cross-branch, LC serial resonance branches are used; lengthwise, inductors L are used (i.e., in particular a series of six inductors wired in series, plus five further branches, each comprising one inductor and one capacitor). Alternatively, it is also possible to use capacitors C in the cross-branch, and parallel resonance blocking branches lengthwise (between the cross-branches). The common feature among these two variants is that, unless the compensation capacitor $C_K$ is present, a simple inductor L is arranged in each case at both the input and the output of the low-pass filter 102, If a low-pass filter 102 of this kind, or a low-pass filter arrangement of this kind having six (but at least five) circuits, is adequately tuned, it exhibits the input impedance as shown in FIG. 4. FIG. 4 shows various schematic depictions in relation to the input impedance of the filtering device (low-pass filter 102) from the direction of the balun device assigned to the interface, without the compensation capacitor $C_K$ present. The x axis in the depiction corresponds to the frequency in Hz, and the y axis corresponds to different resistance values in SI The curve with the thin line which starts at 75Ω at low frequencies and ends at 0Ω at high frequencies corresponds to the real part of the input impedance of the filtering device. The curve with the thick line which starts at 0Ω at low frequencies and ends at around 200Ω at high frequencies corresponds to the purely inductive blind part of the input impedance of the filtering device; this increases continuously up to around 160 MHz, which, together with the slightly decreasing real part, corresponds to the continual rise in the reflection (said purely inductive blind part can be actively compensated for, as shown in FIG. 6). The curve which starts at 75Ω at low frequencies and approximates the aforementioned curve with the thick line at high frequencies corresponds to the sum of the real part and imaginary part of the input impedance of the filtering device.

Figure 5:
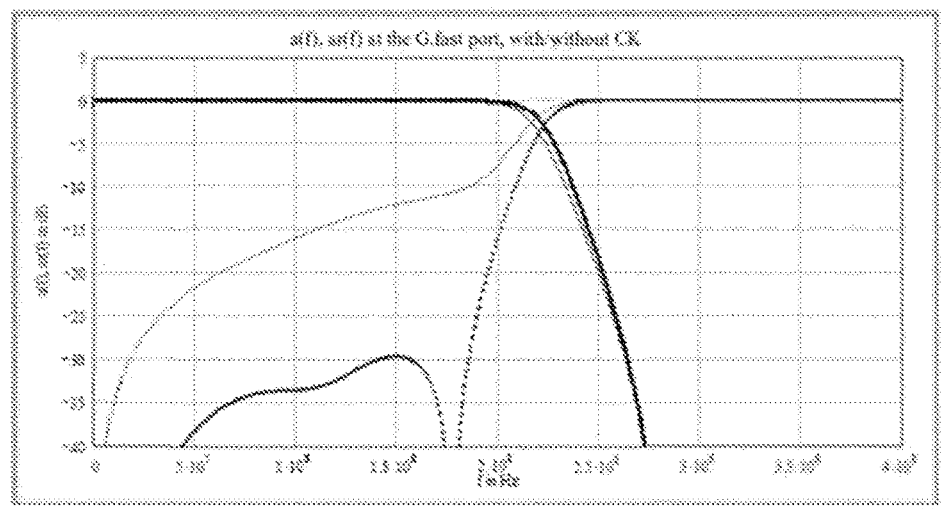
FIG. 5 shows various depictions in relation to the reflection at the input of the filtering device (low-pass filter) from the direction of the balun device assigned to the interface, likewise according to the first embodiment of the invention.

Via the compensation capacitor $C_K$, according to the first embodiment it is possible according to the invention, in a comparatively manner, to adjust the input impedance of the filtering device 102 with respect to reflections from the direction of the customer terminal output 106. This is shown schematically in FIG. 5. FIG. 5 shows various depictions in relation to the reflection at the input of the filtering device (low-pass filter) from the direction of the balun device assigned to the interface, with and without the compensation capacitor $C_K$. The x axis in the depiction corresponds to the frequency in Hz, and the y axis corresponds to different attenuation values in dB. The thinly dotted curve that rises continually from low frequencies toward high frequencies corresponds to the S11 reflections for the case where no compensation capacitor $C_K$ is present. The likewise thinly dotted (lower) transient curve that starts at 0 dB at low frequencies and is at −40 dB at around 270 MHz also corresponds to said situation. By contrast, the thickly dotted curve that likewise rises at low frequencies (up to around 150 MHz) corresponds to the S11 reflections for the case where the compensation capacitor $C_K$ is present. The likewise thickly dotted (upper) transient curve that starts at 0 dB at low frequencies and is at −40 dB at around 270 MHz also corresponds to said situation (i.e., with the compensation capacitor $C_K$); thus, the signal attenuation also benefits from the action of the compensation capacitor $C_K$).

If, however, unfavorable low-pass filter tuning is selected, in which the blind part of the input impedance is relatively strong and switches from inductive to capacitive multiple times up to the low-pass filter flank, this is also reflected in a wavy, discontinuous signal attenuation curve. This is a sign of unfavorable tuning.

FIG. 6 shows various depictions in relation to the compensated input impedance of the filtering device (low-pass filter) 102 from the direction of the balun device assigned to the interface 400, according to the first embodiment of the invention. The x axis in the depiction corresponds to the frequency in Hz, and the y axis corresponds to different resistance values in Ω. The curve with the thick line which starts at 0Ω at low frequencies and ends at low resistance values at slightly above 250 MHz corresponds to the inductive blind part of the input impedance: When the compensation capacitor $C_K$ is selected accordingly, this inductive blind part vanishes almost entirely up to around 180 MHz, after which it rises in a resonant manner and falls back into capacitive above 250 MHz. The curve with the mid-thickness line shows that the impedance value drops toward 'short circuit' above 250 MHz. However, this is not a problem because above approximately 250 MHz the transmitting G.fast modem has a power spectral density PSD of merely <−120 dBm/Hz, and the low-pass filter 102, on the opposite side (i.e., at the IN port 303), likewise has a similar reflection attenuation to FIG. 5 (see therein the thicker dotted curve of the S11 reflections for the case where the compensation capacitor $C_K$ is present). It can also be seen that, as a result of the blind proportion being compensated for, the real part has risen again to around 200 MHz; this corresponds to the curve of the now-lower signal attenuation in FIG. 5 (the upper, thickly dotted transient curve that starts at 0 dB at low frequencies and is at −40 dB at around 270 MHz).

According to the invention, therefore, it is advantageously possible according to the first embodiment to use a compensation capacitor in order achieve an increase in reflection attenuation: By suitably tuning the low-pass filter 102 to exhibit a continuous rise in the inductive blind proportion and a slight drop in the real part of the input impedance, similarly to FIG. 4, the reflection attenuation in the useful range is increased efficiently and very simply using the compensation capacitor $C_K$ (as per the depiction according to FIG. 3). This also benefits the lower signal attenuation. Typically, this compensation causes the surge impedance of the twin line in the choke device 108 (CM choke) to be around 75Ω.

According to a second embodiment, it is provided according to the invention that the input impedance of the filtering device 102 is adjusted with respect to reflections from the direction of the customer terminal output 106 in that twin lines having a characteristic impedance that differs from the characteristic impedance of the coaxial cable 302 are used to implement the choke device 108. In particular, the impedance transformation can be implemented on the basis of a short length of the twin lines, wherein in particular twin lines having a characteristic impedance in the range between 45Ω and 65Ω, preferably between 50Ω and 60Ω, in particular 55Ω, are used. As a result, compared with the first embodiment using a compensation capacitor $C_K$, a further method is thus provided for successfully compensating for the inductive rise in the input impedance of the low-pass filter at least in a relatively narrow frequency range. In particular, according to the second embodiment, it is provided according to the invention that enamel-insulated wires of various thicknesses are used to produce the laps of directional couplers, transformers, and CM chokes. For the CM chokes, in particular regularly twisted twin lines made of said enameled wire are used, which are wound through an annular core or twin-hole core. These enameled-wire twin lines have a characteristic impedance in the region of approximately 55Ω depending on their geometry. Since this twin line is terminated not with its characteristic impedance but with a higher value of around 75Ω, impedance transformation occurs in this case owing to the length of this twin line. On this basis, the behavior switches from capacitive to inductive.

The capacitive behavior of this twin line in the first frequency range can now be used to compensate for the inductive proportion of the input impedance of the low-pass filter.

At higher frequencies, such as in G.fast 212 and G.fast 424, a targeted impedance transformation is used, the transformation being such that the curve of the inductive increase is raised. To implement sufficient CM attenuation, a certain minimum length of twin line has to be used. In addition, attempts have to be made to tune the input impedance of the low-pass filter such that it matches as closely as possible the capacity of an impedance transformation to perform compensation.

According to the invention, it is provided in particular that the balanced-to-unbalanced transformer device 104 (balun device 104) has a two-stage design, i.e., has the choke device 108, in particular in the form of a CM choke, on the unbalanced side and the transformer device 110 on the balanced side.

Alternatively to this structure of the balun device 104, with the choke device 108 on the unbalanced side and the transformer device 110 on the balanced side, it is also possible according to the invention to swap the positions of the CM choke and the transformer, although this generally causes issues with the reflection attenuation owing to the mismatch of the CM choke: Here (i.e., on the balanced side), a 100-Ω surge impedance would be needed, but the enameled wire used only provides approximately 55Ω.

Figure 7:
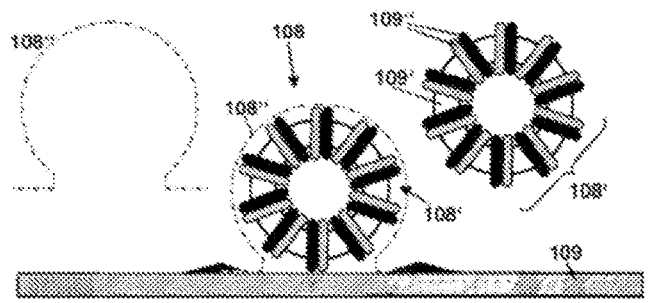
FIG. 7 shows details of an embodiment example of a choke device as part of the balun device assigned to the interface, in particular according to the first embodiment of the invention.
Figure 8:
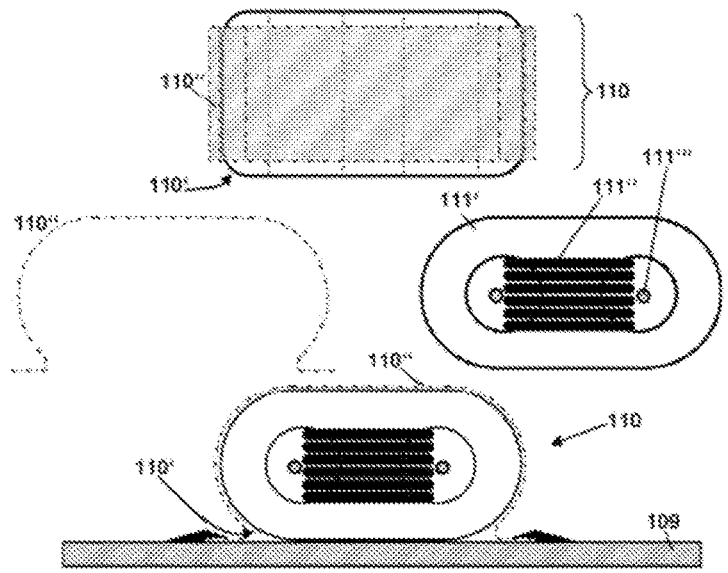
FIG. 8 shows details of an embodiment example of a transformer device as part of the balun device assigned to the interface, in particular according to the first embodiment of the invention.

According to the invention, the balanced-to-unbalanced transformer device 104 (balun device 104) or its components is/are designed or implemented in particular in accordance with the schematic, example illustrations in FIGS. 7 and 8, in particular with reference to the first embodiment.

By way of example, FIG. 7 schematically shows an embodiment of the choke device 108 in its installed state on a printed circuit board 109 or circuit board 109, and independently thereof both the interior 108' of the arrangement of the choke device 108 and its casing 108''. In the top right-hand part of FIG. 7, the interior 108' of the choke device 108 is shown, i.e., the annular core 109' of the choke device 108 around which line laps 109'' are wound. In the top left-hand part of FIG. 7, the casing 108'' of the choke device 108 is shown. In the lower middle part of FIG. 7, the choke device 108 is shown in its installed state, the casing 108'' being in contact with the printed circuit board 109 or with ground, for example soldered or otherwise connected thereto. In this case, the choke device 108 comprises the interior 108' of the arrangement (i.e., the line laps 109'' and the annular core 109') and the casing 108''. The line forming the line laps 109' or the wire or the enameled wire being used (which in particular is multi-insulated) is provided in the form of a twin line (i.e., with the forward and reverse direction in the same winding or lap, as indicated in FIG. 7 by the different hatching of different parts of the line lap 109''). As a result, it is advantageously possible according to the invention to obtain in combination the advantages of high reflection attenuation, very low attenuation without resonance effects, and high balance up to around 1 GHz when the choke device 108 (in particular implemented as a CM choke) in particular has an annular core measuring $D_a$=6.3 mm, $D_i$=3.8 mm; L=2.5 mm (external diameter, internal diameter, length, respectively) and an inductance per winding (AL) of approximately 1.1 μH. In particular, highly twisted twin lines (for example having a twist length or pitch of around five times the diameter of the twin core or of around ten times the diameter of the single core) having a surge impedance of around 75Ω (multi-insulated wires) are used, comprising approximately 10 windings at the same spacing and in just one layer. Furthermore, according to the invention the CM choke is preferably encased via an omega-shaped copper band as a casing 108'', which is, for example, soldered to the copper lamination of the circuit board 109. The spacing of the casing and the width have to be experimentally determined.

By way of example, FIG. 8 schematically shows an embodiment of the transformer device 110 in its installed state on a printed circuit board 109 or circuit board 109, and independently thereof both the interior 110' of the arrangement of the transformer device 110 and its casing 110'', along with a plan view. In the right-hand part of FIG. 8, the interior 110' of the transformer device 110 is shown, i.e., the twin-hole core 111' of the transformer device 110 around which the inner lap 111'' and the outer lap 111''' are wound. In the left-hand part of FIG. 8, the casing 110'' of the transformer device 110 is shown. In the lower middle part of FIG. 8, the transformer device 110 is shown in its installed state, the casing 110'' being in contact with the printed circuit board 109 or with ground, for example soldered or otherwise connected thereto. The upper part of FIG. 8 shows a plan view of the transformer device 110, comprising the interior 110' of the transformer device 110 and the casing 110'' of the transformer device 110. In particular, according to the invention the transformer device 110 has a twin-hole core 111' measuring B=6.9 mm; H=3 mm; L=6 mm; and an inductance per lap (AL) of approximately 7.3 μH. In each case one half-winding in the left-hand hole and one half-winding in the right-hand hole of the twin-hole core 111' form the outer lap 111'''; six windings form the inner lap 111''. This results in a winding ratio of 6:7, corresponding to 75:102Ω. Furthermore, according to the invention, in the transformer device 110 the arrangement consisting of the twin-hole core 111' and laps 111'', 111''' is in particular very tightly, directly encased via a wide omega-shaped copper band, which in particular is soldered onto (or otherwise contacted with) the copper lamination of the circuit board, there preferably being no spacing from the twin-hole core 111'.

The copper casings 108', 110' increase the CM attenuation or the TCL of the balun device 104 by capacitively dissipating the CM signal.

Contact with the midpoint of the inner lap 111'' of the transformer 110 (or the transformer device 110) causes an increase in the TCL at lower frequencies but a reduction at higher frequencies.

Since the highest possible attenuation is advantageous with respect to the feared irradiation with LTE signals (i.e., signals as per the 4G mobile communications standard LTE, or long-term evolution), according to the invention the inner lap preferably is not grounded. Since there are two LTE frequency bands (694-790 MHz and 791-862 MHz) in the TV channel range up to 864 MHz, according to the invention shielding measures are provided inside the end user interface 400 or multimedia outlet: To prevent the individual attenuations of the balun device 104 and of the low-pass and high-pass filters from being nullified as a result of CM crosstalk between the individual modules, preferably at least the balun device 104 should be completely separated from the other three modules using a shield against high-frequency signals. According to the invention, it is optionally also provided to arrange further shields in the end user interface 400 or multimedia outlet.

According to the invention, therefore, it is overall possible to satisfy even increased requirements placed on the relatively large useful bandwidth (up to 424 MHz) of the balun device 104 for a maximum attenuation of 1.1 dB at 424 MHz, and to implement a steeper LC high-pass filter characteristic and low-pass filter characteristic compared with conventionally known technologies, which have to be operated right up to the respective filter flanks owing to the narrow frequency gap between the G.fast useful signals (i.e., the subscriber connection signals) on the one hand and the first TV channel on the other. Furthermore, according to the invention, high balance attenuation is advantageously achieved up to 1 GHz owing to high resistance to LTE irradiation at 700 MHz and 800 MHz, and so too is reflection attenuation of at least 22 dB at the G.fast port and at the IN port up to approximately 370 MHz, in order to make the use of G.fast Simplex 424 and G.fast Duplex 424 accessible.

In addition, according to the invention, the reflection attenuation and the linearity of the G.fast interface are advantageously implemented so as to be able to utilize the potential of the coaxial star cable topology, which is considerably higher than that of a copper twin core.

The technical effort, in particular for the balun device 104 and the low-pass filter 102, is relatively low for the filter design according to the invention and for the stated measures, for example for ensuring the reflection attenuation and the balance.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transmitting digital subscriber connection signals to an interface of an end user via a coaxial cable, wherein the coaxial cable has an overall frequency range configured for transmitting TV signals to the interface of the end user in an upper frequency range of the overall frequency range, wherein the interface comprises a customer terminal output, wherein the method comprises the following steps:

supplying, by a distribution point unit first balanced subscriber connection signals to the coaxial cable by a first transformation, directed toward the customer terminal output, of the first balanced subscriber connection signals into unbalanced subscriber connection signals by means of a distribution point balanced-to-unbalanced transformer device (balun device);

coupling the unbalanced subscriber connection signals into the coaxial cable into a lower frequency range of the overall frequency range, wherein the lower frequency range is below the upper frequency range without any overlap;

attenuating, by means of a filtering device, a reflection of the unbalanced subscriber connection signals in the coaxial cable;

a second transformation, directed toward the customer terminal output, of the unbalanced subscriber connection signals into second balanced subscriber connection signals by means of a balun device assigned to the interface, wherein the input impedance of the filtering device is adjusted with respect to reflections from the direction of the customer terminal output; and separately making the second balanced subscriber connection signals available at the customer terminal output.

2. The method according to claim 1, wherein the balun device assigned to the interface comprises a choke device and a transformer device, wherein the choke device is passed through first and the transformer device is passed through next in the direction of the customer terminal output, wherein the input impedance of the filtering device is adjusted by a compensation capacitor between the filtering device and the balun device assigned to the interface, wherein the compensation capacitor is arranged between the filtering device and the choke device.

3. The method according to claim 2, wherein the input impedance of the filtering device is adjusted using impedance transformation in that twin lines having a characteristic impedance that is different from the characteristic impedance of the coaxial cable are used to implement the choke device wherein the impedance transformation is implemented on the basis of a short length of the twin lines, wherein twin lines having a characteristic impedance in the range between 45Ω and 65Ω are used.

4. The method according to claim 2, wherein the impedance compensation is carried out by means of the choke device and the transformer device, in addition to the compensation capacitor, wherein the choke device comprises an annular core and an inductance per winding of between 1.0 µH and 1.2 µH, and wherein the annular core is wrapped in wire in the form of a twin line, wherein the wire is a multi-insulated wire and in particular has a characteristic impedance of between 65Ω and 85 Ω.

5. The method according to claim 2, wherein the transformer device is configured to transform impedances in a range between 65Ω and 85Ω into an impedance of between 95Ω and 105 Ω.

6. The method according to claim 2, wherein the choke device is a common-mode choke, wherein the choke device comprises 10 windings and a common-mode inductance of 110 µH; and/or wherein the transformer device comprises magnetizing inductances of 263 µH on a 75-Ω side and of 353 µH on a 100-Ω side.

7. The method according to claim 1, wherein, for a plurality of coaxial cables, the first transformation, directed toward the customer terminal output, comprises converting a plurality of balanced digital subscriber connection signals into a plurality of unbalanced digital DSL signals, wherein the distribution point balun device located at the DPU is a multiple balun unit, wherein the plurality of balanced digital subscriber connection signals have an impedance in a first impedance range and the plurality of unbalanced digital subscriber connection signals have an impedance in a second impedance range, and/or wherein the second transformation, directed toward the customer terminal output, causes the unbalanced digital subscriber connection signals having an impedance in the second impedance range to be converted into second balanced subscriber connection signals having an impedance in the first impedance range and in a frequency range between 1 MHz and 444 MHz, wherein the first impedance range is in the range between 95Ω and 105Ω, and the second impedance range is in the range between 70Ω and 80Ω.

8. The method according to claim 1, wherein the unbalanced subscriber connection signals are coupled into the coaxial cable at an impedance in a second impedance range using 75-Ω TV bidirectional couplers, wherein the coaxial cable in particular is part of a coaxial TV star topology of a building.

9. The method according to claim 1, wherein the lower frequency range includes subscriber connection signals up to around 212 MHz and/or the upper frequency range includes the TV signals above around 262 MHz; or
wherein the lower frequency range includes subscriber connection signals up to around 424 MHz and/or the upper frequency range includes the TV signals above around 524 MHz.

10. The method according to claim 1, wherein, at the customer terminal output of the interface, input reflection attenuation of more than or exactly 22 dB is carried out up to at least 350 MHz.

11. The method according to claim 1, wherein the balun device assigned to the interface implements transverse conversion loss of at least 25 dB between 2 MHz and 1 GHz; and/or
the balun device assigned to the interface implements attenuation of S21, the forward transmission coefficient, of less than 4 dB between 2 MHz and 1 GHz.

12. Interface of an end user for use in a method according to claim 1, for transmitting digital subscriber connection signals to the interface via the coaxial cable, wherein the coaxial cable has an overall frequency range configured for transmitting TV signals to the interface of the end user in the upper frequency range of the overall frequency range, wherein the interface comprises the customer terminal output, wherein, with respect to unbalanced subscriber connection signals which are in the lower frequency range of the overall frequency range, said lower frequency range being below the upper frequency range without any overlap, and which are coupled into the coaxial cable, the interface is configured such as to cause:
a reflection of the unbalanced subscriber connection signals in the at least one coaxial cable to be attenuated by means of a filtering device, and
the second transformation, directed toward the customer terminal output, of the unbalanced subscriber connection signals into second balanced subscriber connection signals to be carried out by means of the balun device, assigned to the interface, wherein the input impedance of the filtering device is adjusted with respect to reflections from the direction of the customer terminal output, and
the second balanced subscriber connection signals to be separately made available at the customer terminal output,
wherein, in addition to a TV output, the interface comprises the customer terminal output and is configured to make TV signals available at the TV output in the upper frequency range and to make balanced subscriber connection signals available at the customer terminal output in the lower frequency range.

13. A system for transmitting digital subscriber connection signals to an interface of an end user via a coaxial cable, wherein the coaxial cable has an overall frequency range configured for transmitting TV signals to the interface of the end user in an upper frequency range of the overall frequency range, wherein the interface comprises a customer terminal output, wherein the system comprises:
at least one distribution point unit (DPU);
the coaxial cable; and
the interface having the customer terminal output;
wherein the system is configured such as to cause:
a distribution point units (DPU) to supply first balanced subscriber connection signals to the coaxial cable by a first transformation, directed toward the customer terminal output, of the first balanced subscriber connection signals into unbalanced subscriber connection signals by means of a distribution point balanced-to-unbalanced transformer device, (balun device);
the unbalanced subscriber connection signals to be coupled into the coaxial cable into a lower frequency range of the overall frequency range, wherein the lower frequency range is below the upper frequency range without any overlap,
a reflection of the unbalanced subscriber connection signals in the coaxial cable to be attenuated by means of a filtering device;
a second transformation, directed toward the customer terminal output, of the unbalanced subscriber connection signals into second balanced subscriber connection signals to be carried out by means of a balun devices assigned to the interface, wherein the input impedance of the filtering device is adjusted with respect to reflections from the direction of the customer terminal output; and
the second balanced subscriber connection signals to be separately made available at the customer terminal output.

* * * * *